United States Patent [19]
Ho

[11] Patent Number: 5,966,826
[45] Date of Patent: Oct. 19, 1999

[54] DUAL USAGE LEVEL MARKING INSTRUMENT

[76] Inventor: Ko-Liang Ho, No. 305, Hua Cheng Rd., Hsinchuang, Taipei Hsien, Taiwan

[21] Appl. No.: 08/872,042

[22] Filed: Jun. 10, 1997

[51] Int. Cl.[6] .............................. G01C 9/28; G01C 5/00
[52] U.S. Cl. ........................... 33/365; 33/275 R; 33/290; 33/384; 33/DIG. 21
[58] Field of Search .............................. 33/385, DIG. 21, 33/286, 227, 365, 275 R, 276, 285, 290, 291, 292, 248, 284

[56] References Cited

U.S. PATENT DOCUMENTS

| | | | |
|---|---|---|---|
| 75,534 | 3/1868 | Davis | 33/385 |
| 82,769 | 10/1868 | Traut | 33/385 |
| 1,298,844 | 4/1919 | Wichertjes | 33/385 |
| 3,533,700 | 10/1970 | Alexander | 33/286 |
| 4,333,244 | 6/1982 | Bailey | 33/290 |
| 4,764,010 | 8/1988 | Bachmann et al. | 33/286 |
| 4,999,921 | 3/1991 | Bird et al. | 33/385 |
| 5,400,514 | 3/1995 | Imbrie et al. | 33/286 |
| 5,519,942 | 5/1996 | Webb | 33/290 |
| 5,531,031 | 7/1996 | Green | 33/DIG. 21 |
| 5,561,911 | 10/1996 | Martin | 33/290 |
| 5,713,135 | 2/1998 | Acopulos | 33/286 |

*Primary Examiner*—Andrew Hirshfeld
*Attorney, Agent, or Firm*—Rosenberg, Klein & Bilker

[57] ABSTRACT

A dual usage level marking instrument is provided that includes a leveling rod. This rod has a dotted-type laser device fixed at one end and a straight-type laser device fixed at the other end. Leveling elements are installed on this rod. The dotted-type or straight-type device installed on the both ends emit dotted or vertical/horizontal marking lines. The instrument is used on construction sites for marking measurement.

1 Claim, 5 Drawing Sheets

DUAL USAGE LEVEL MARKING INSTRUMENT

BACKGROUND OF THE INVENTION

1. Field of the Invention

This invention concerns a dual usage level marking instrument. It refers particulary to a level marking instrument for use on construction sites for measuring a level condition, height differences or to establish a vertical line, to achieve usage that is fast and convenient.

2. Prior Art

Conventional level marking instruments are mainly used on construction sites to measure a level condition, but due to their limited functions and inconvenient operation, industrial users find it inconvenient to use and not sufficiently functional, and thus needing improvement.

SUMMARY OF THE INVENTION

The main purpose of this invention is to provide a dual usage level marking instrument. It consists of a rod structure with a dotted-type or line-type laser device fixed at respective ends. Leveling elements are installed on this rod structure. The dotted-type or line-type device installed on the both ends emits a dotted or vertical/horizontal marking line. It can be used on construction sites for the measurement of a level condition, measurement of height differences or establishment of a vertical line, etc. for the foundation, flooring, walls or drains, etc., so as to provide usage that is fast and convenient.

DESCRIPTION OF THE PREFERRED EMBODIMENTS

Referring to FIGS. 1–4, a dual usage level marking instrument is provided. The instrument consists of a horizontal body 10 made of aluminum alloy. The two ends of the horizontal body 10 respectively have a dotted-type or line-type laser device 11 installed therein. The rectangular leveling element 12 is installed at a central position of the horizontal body 10. The horizontal body 10 has at least one other circular leveling element 13, 14 installed on both sides of the horizontal body 10.

Figure 1:
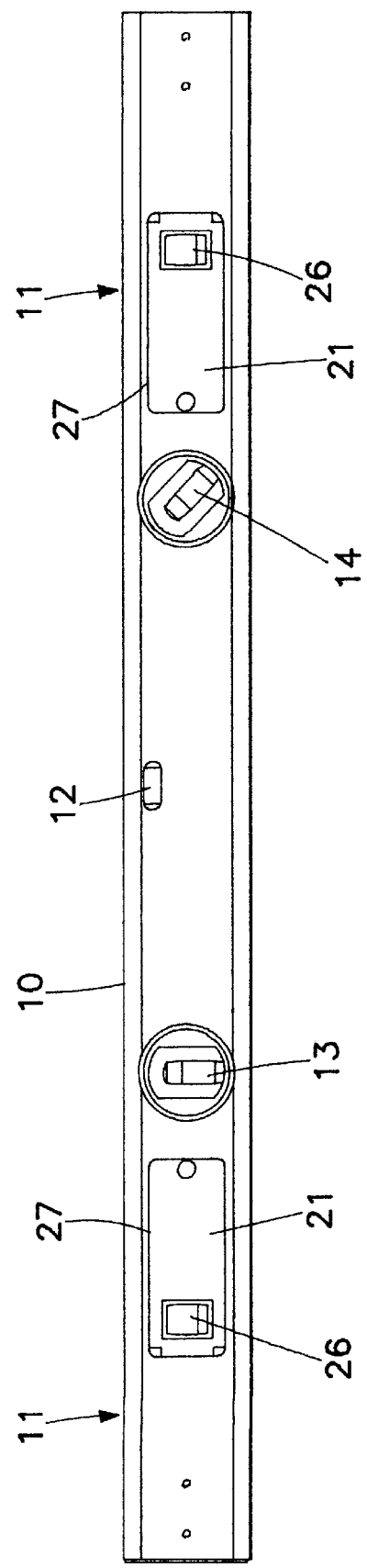
FIG. 1 is a front view of the present invention.
Figure 2:
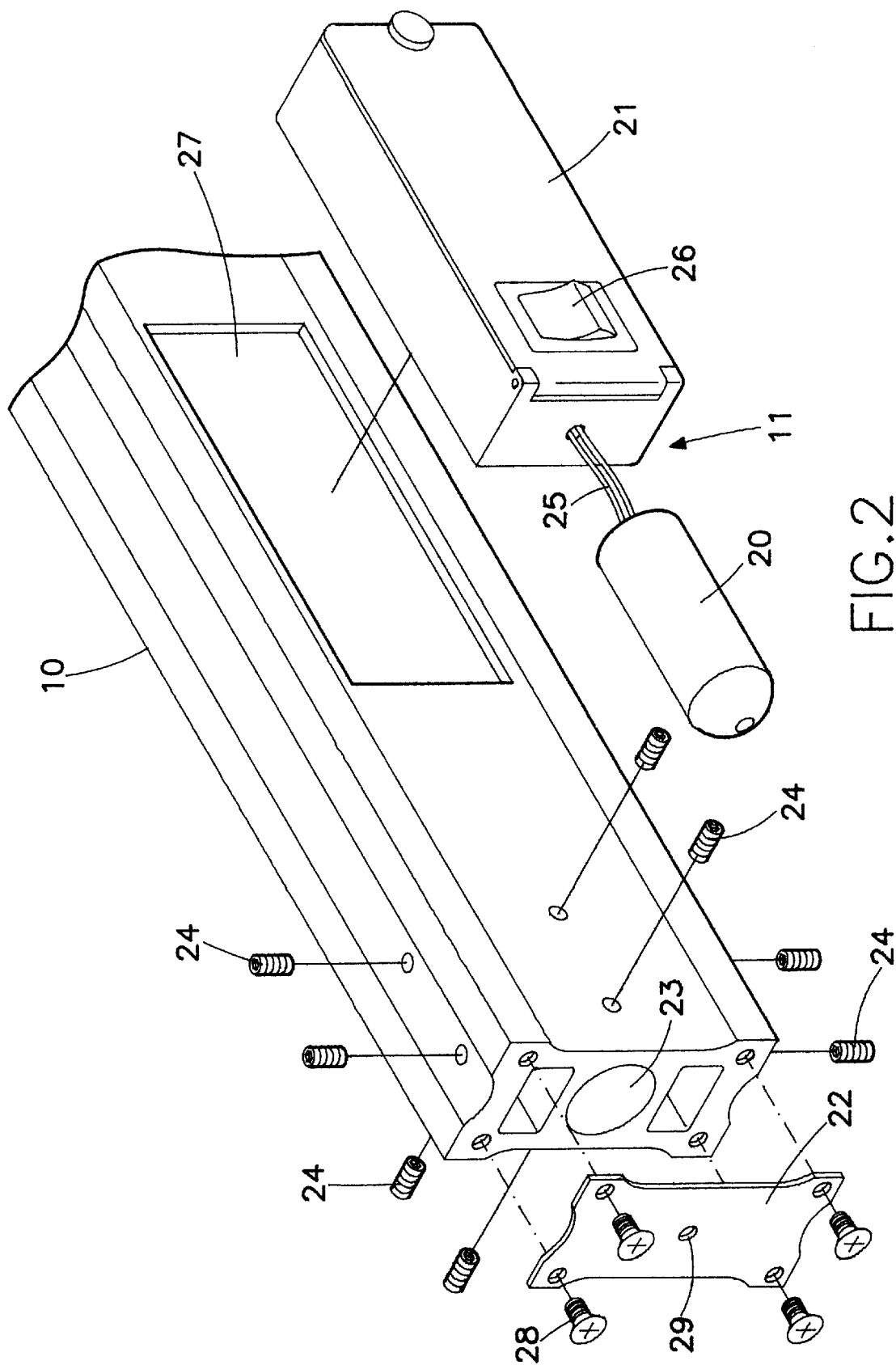
FIG. 2 is an exploded enlarged perspective view of the present invention.
Figure 3:
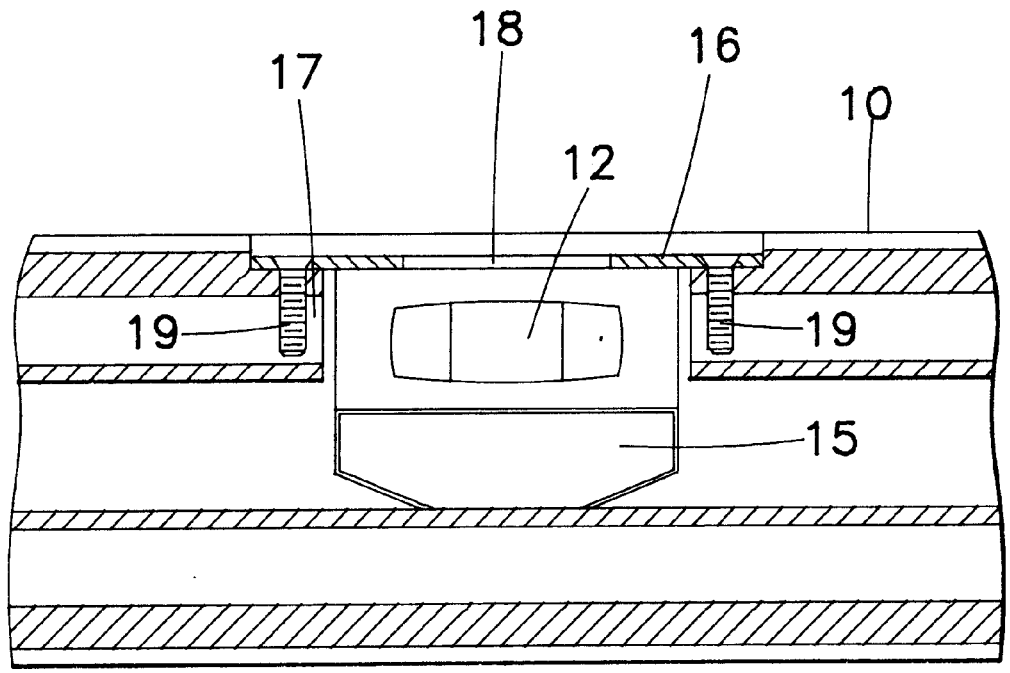
FIG. 3 is a cross-sectional view of the level elements of the present invention.
Figure 4:
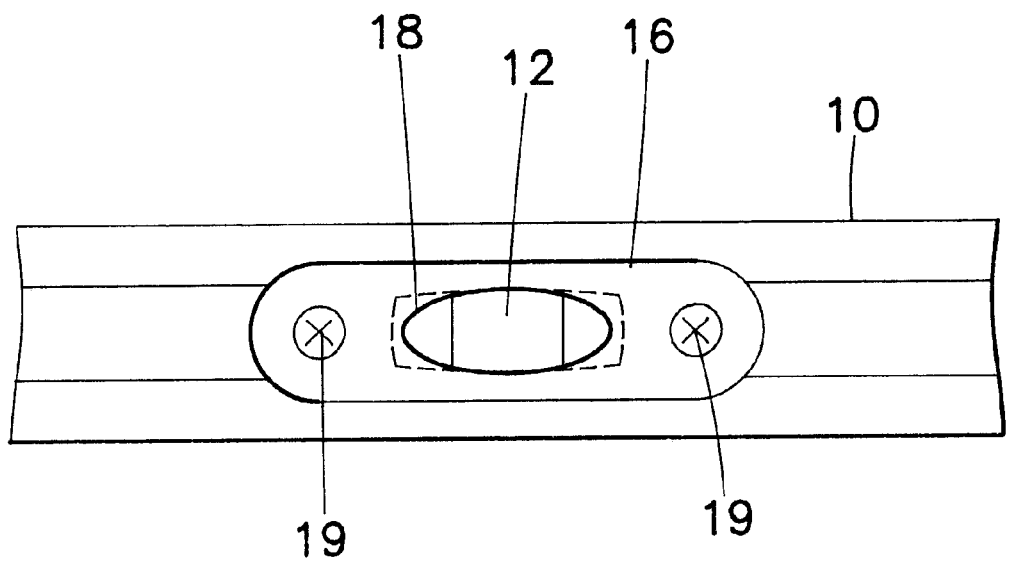
FIG. 4 is a top view of the level elements of the present invention.

The rectangular leveling element 12 is installed on an upper portion of the horizontal body 10 and is secured within a concave groove 17 in the center of the horizontal body 10 with the positioning plate 15 and fixed board 16 (shown in FIG. 3 and FIG. 4). The positioning plate 15 is placed at the bottom of the concave groove 17. The leveling element 12 is placed on the positioning plate 15, and the fixed board 16 with a window opening 18 is locked onto the horizontal body 10 with two screws 19. The bottom of the fixed board 16 is fixed on the top of the leveling element 12 and the window opening 18 overlaying the leveling element 12. For the leveling element 12, if misalignment occurs during installation or after a period of use, the two screws 19 may be tightened or loosened to adjust the leveling element 12, through the elastic support provided by the positioning plate 15. After adjusting the level, the screws 19 may be secured using screw adhesive glue or instant glue.

Figure 5:
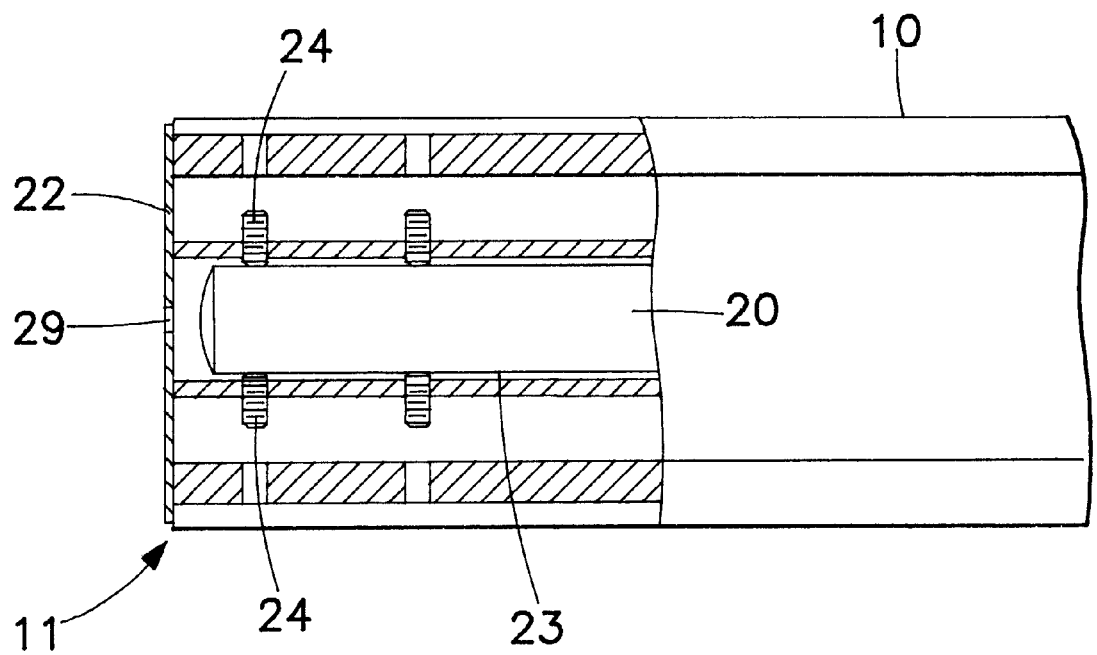
FIG. 5 is a cross-sectional view of the laser device of the present invention.
Figure 6:
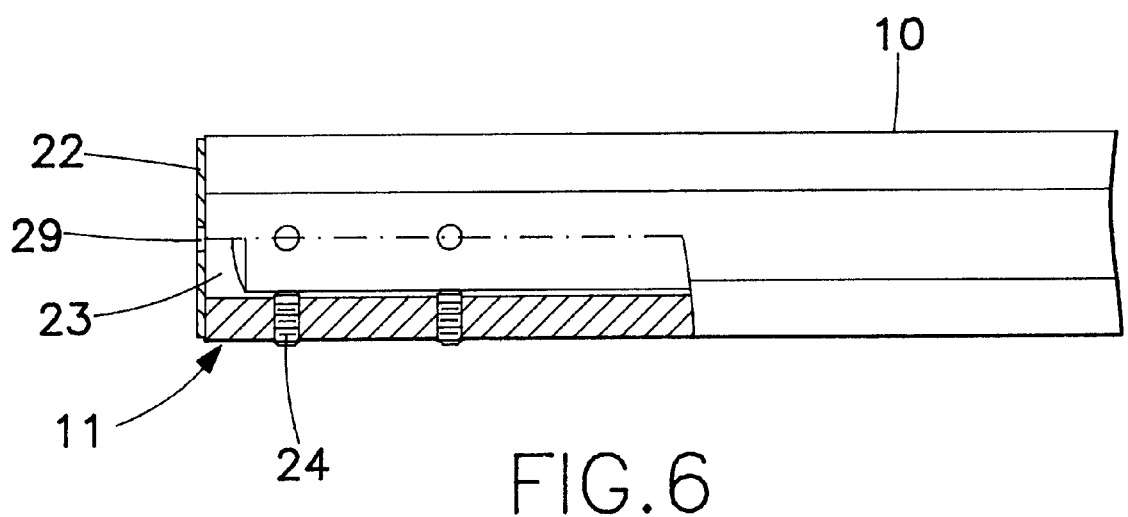
FIG. 6 is a top partially sectioned view of the laser device of the present invention; and, FIG. 7 is a perspective view of the present invention illustrating its use.

The laser device is comprised of the laser head 20, laser battery box 21 and a fixed board 22. Depending on whether the ray emitted from the laser head 20 is of dotted or a vertical/horizontal line, it can be classified into two specification, i.e. dotted type or vertical/horizontal type. The laser head 20 is installed in the fixed hole 23 on both ends of the horizontal body 10 (as shown in FIG. 5 and FIG. 6). The rear, front, upper and lower part of the laser head 20 is secured in the fixed hole 23 using two screws 24 each. The ray-axis of the laser head 20 may be adjusted with the tightening and loosening of the screws 24 so as to minimize alignment error. The internal composition of the laser head 20 includes an electrical circuit board (not shown in the Figures). The laser head 20 is connected via the conductors 25 to the battery box 21. The battery box 21 has a switch 26 to control the emission of the ray from the laser head 20. The battery box 21 is secured within the fixed hole 27 near the two ends of the horizontal body 10. A fixed board 22 is secured to each of the two ends of the horizontal body 10 via several screws 28. Each fixed board 22 has an emission hole 29 in alignment with the laser head 20, so that the laser ray from the laser head 20 is emitted from the emission hole 29.

Figure 7:
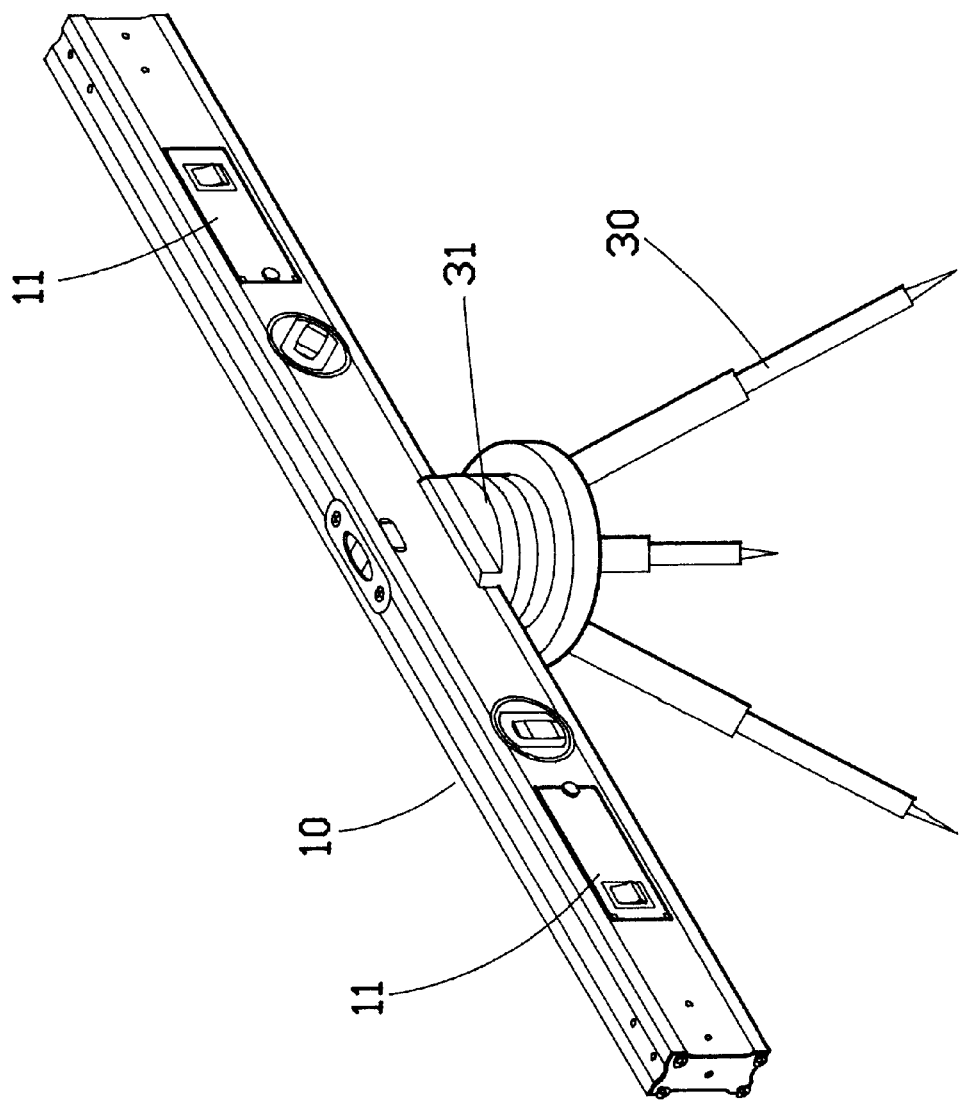

Referring to FIG. 7, the dual usage level marking instrument of the instant invention may be placed on the swivel base 31 of the tripod 30. Besides being able to measure a level condition and other angles through the use of leveling elements 12, 13, and 14 on the horizontal body, the dotted-type or line-type laser device 11 of this invention can emit dotted or horizontal/vertical level markings. This invention may be applied on foundations of construction projects, flooring, walls or drainage construction. It measures level conditions, height differences or establishes a vertical line in a quick and convenient manner.

The preceding description is to be taken as being illustrative of an embodiment of the instant invention, and not meant to be limiting on the scope of the appended claims.

I claim:

1. A dual usage level marking instrument, comprising:

a longitudinally extended body member having a pair of openings respectively formed in opposing longitudinal ends thereof, each of said opposing ends having a plurality of pairs of spaced threaded holes formed both horizontally and vertically therein and in open communication with a respective one of said openings, said body member having a centrally disposed concave groove formed in an upper portion thereof;

a pair of laser devices respectively secured to said opposing ends of said body member, each said laser device having a laser head adjustably positioned in a respective one of said pair of openings;

a plurality of screws respectively threadedly engaged with said plurality of pairs of threaded holes and contacting a respective one of said laser heads for adjusting an emission axis of said laser heads;

a leveling element disposed in said concave groove;

an elastic positioning plate disposed in said concave groove beneath said leveling element;

a fixed board having an aperture formed therethrough and being secured by threaded fasteners to said upper portion of said body member, said fixed board having a window opening overlaying at least a portion of said leveling element, an alignment of said leveling element with respect to said body member being adjusted by adjusting a tightness of said threaded fasteners, thereby altering the degree of compression of said elstic positioning plate; and, at least one circular leveling element coupled to said body member.

* * * * *